Patented May 10, 1949

2,469,728

UNITED STATES PATENT OFFICE 2,469,728

INCREASING ADHESIVITY OF ASPHALT TO MINERAL AGGREGATE CONSISTING OF MOLLUSK SHELLS

August Holmes, Cranford, N. J., assignor to Standard Oil Development Company, a corporation of Delaware No Drawing. Application October 17, 1945, Serial No. 622,931

2 Claims. (Cl. 106—283)

This invention relates to improvements in the preparation of a surface composition that is adapted to coat roads, pavements, garage floors, cellar floors or other surfaces where a coating is required that will withstand hard wear and remain dustless.

In various parts of the country where roads are being paved it is found necessary to bring in the mineral aggregate over a considerable distance due to the local absence of the mineral aggregates that are generally used in paving mixtures. In these areas often are found calcareous deposits, such as oyster shell beds and clam shell beds, which, heretofore, have not been used extensively in paving due to the tendency of the asphalt and shells to part upon being subjected to traffic.

An object of this invention is to produce surface compositions from the calcareous deposits which have heretofore not been used to any great extent, which compositions will provide a surface that will withstand hard wear and also maintain an even, hard, dustless surface over a prolonged period of time.

According to this invention, it has been found that highly calcareous aggregates, such as clam shells and oyster shells, will form a paving composition of the desired properties if they are first treated with a dilute mineral or other strong acid before admixing with cutback asphalt containing the wetting agent. The wet calcareous aggregate should be treated, preferably, with 5%–10% of dilute mineral acid solution preferably having about 2% to 5% concentration in order to obtain satisfactory adhesivity when mixed with the asphalt containing an amine wetting agent, as described in U. S. Patent No. 2,191,295, issued on February 20, 1940, to Hans Dohse and Fritz Spoun.

The mineral acids successfully employed were $H_2SO_4$, $HCl$, $HNO_3$ and $H_3PO_4$; results with acetic acid were only moderately good as compared with chloracetic acid. The calcareous shell aggregates can be also treated with dilute solutions of zinc or lead salts which give the same results as obtained with the dilute mineral acids. The strong organic acids, such as halogenated acetic acids, can also be used for pretreating the clam and oyster shells.

The wetting agents used are primary amines with lipophilic radicals, as, for example, laurylamine or amines having a greater number of carbon atoms in the chain. Also useful are derivatives of ammonia that have several substituents on the nitrogen of which at least one of them is preferably a lipophilic radical as, for example, an alkyl radical of high molecular weight. The presence of aromatic radicals may also be of advantage. The hydrocarbon radicals may also carry substituents, for example, they may contain halogen. The moderately high molecular weight organic amines are used according to this invention; these may likewise be used in conjunction with fatty acids. These wetting agents are particularly adaptable for coating wet aggregate. Pretreating the calcareous aggregate with dilute mineral acid followed by lead salt or zinc salt solution also gives good results with the treated cutbacks.

Alternately, the calcareous aggregate may be treated with a dilute mineral acid and mixed with an asphalt containing an aliphatic amine having at least one lipophilic radical in the molecule, and an organic acid having at least eight carbon atoms to the molecule, preferably a fatty acid such as oleic acid. The fatty acid used is preferably one having sixteen to twenty carbon atoms to the molecule.

What is claimed is:

1. In a process for preparing asphaltic road surfacing material employing an aggregate consisting of mollusk shells, the improvement which comprises pretreating said mollusk shells with a dilute solution of a strong mineral acid of 2% to 5% concentration and subsequently coating said pretreated aggregate with an asphalt.

2. In a process for preparing asphaltic road surfacing material employing an aggregate consisting of mollusk shells, the improvement which comprises pretreating said mollusk shells with a dilute solution of a strong mineral acid of 2% to 5% concentration and subsequently coating the said pretreated aggregate with an asphalt containing an aliphatic amine having at least one lipophilic radical directly attached to a nitrogen atom, and an organic acid containing at least 8 carbon atoms to the molecule.

AUGUST HOLMES.

REFERENCES CITED

The following references are of record in the file of this patent:

UNITED STATES PATENTS

| Number | Name | Date |
|---|---|---|
| 2,283,937 | Mack | May 26, 1942 |
| 2,212,574 | Roth | Aug. 27, 1940 |
| 2,191,295 | Dohse et al | Feb. 20, 1940 |
| 2,056,520 | Holbrook et al. | Oct. 6, 1936 |
| 1,361,140 | Colloid | Dec. 7, 1920 |
| 1,164,041 | Warren | Dec. 14, 1915 |

FOREIGN PATENTS

| Number | Country | Date |
|---|---|---|
| 568,385 | Great Britain | Apr. 3, 1945 |
| 560,716 | Great Britain | Apr. 18, 1944 |
| 417,776 | Canada | Jan. 18, 1944 |